June 24, 1930.  W. GILLOOLY  1,767,208
CUTTING MACHINE
Filed May 20, 1929   2 Sheets-Sheet 1

Inventor:
William Gillooly,
By Dyrenforth, Lee, Chritton & Wiles,
Attys.

June 24, 1930.  W. GILLOOLY  1,767,208
CUTTING MACHINE
Filed May 20, 1929  2 Sheets-Sheet 2
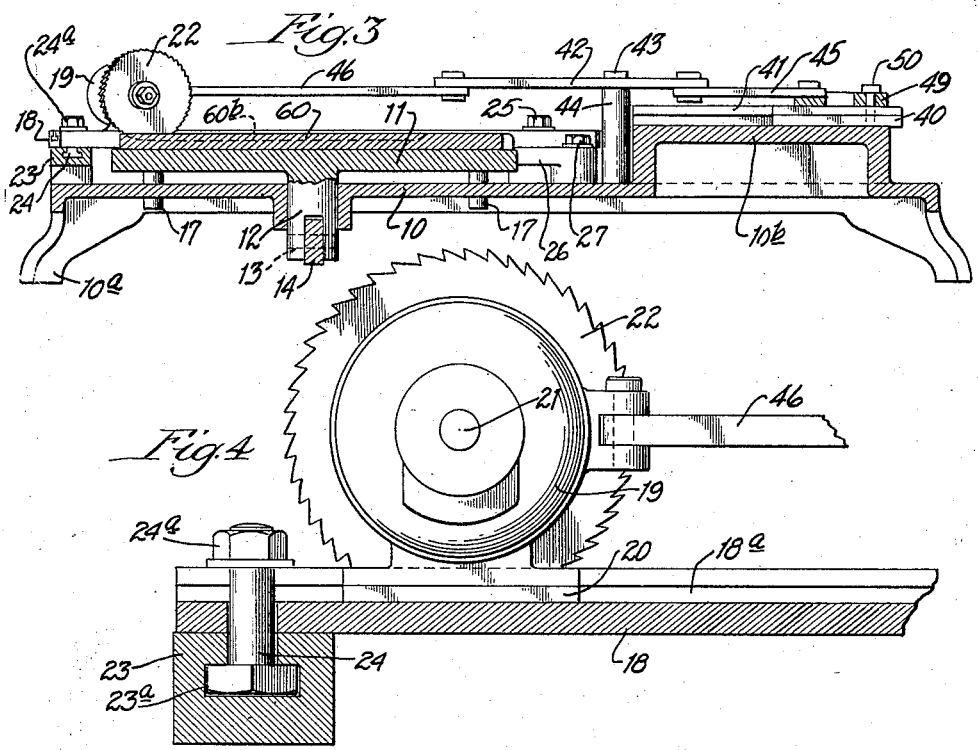

Patented June 24, 1930

1,767,208

UNITED STATES PATENT OFFICE

WILLIAM GILLOOLY, OF STREATOR, ILLINOIS, ASSIGNOR TO METAL STAMPINGS CORPORATION, OF STREATOR, ILLINOIS, A CORPORATION OF ILLINOIS

CUTTING MACHINE

Application filed May 20, 1929. Serial No. 364,587.

This invention relates to improvements in cutting machines and is here shown embodied in a machine especially adapted for routing, grooving, rabbeting, or otherwise cutting wooden panels, dados and the like.

Among the features of my invention is the provision of such a machine that can be easily and quickly adjusted to cut accurately and exactly in accordance with certain desired measurements, and which, when once so adjusted, can operate rapidly on successive pieces of work without variation from the desired measurements.

Another feature of my invention is the provision of means permitting quick and accurate adjustment of the cutters to cause them to operate accurately at or near the edges of a panel or other piece of wood, for the purpose, for example, of rabbeting or grooving the edges thereof.

My improved cutter is easy to manipulate and capable of rapid and accurate operation.

Other features and advantages of my invention will appear more fully as I proceed with my specification.

In that form of device embodying the features of my invention shown in the accompanying drawings—

Figure 1:
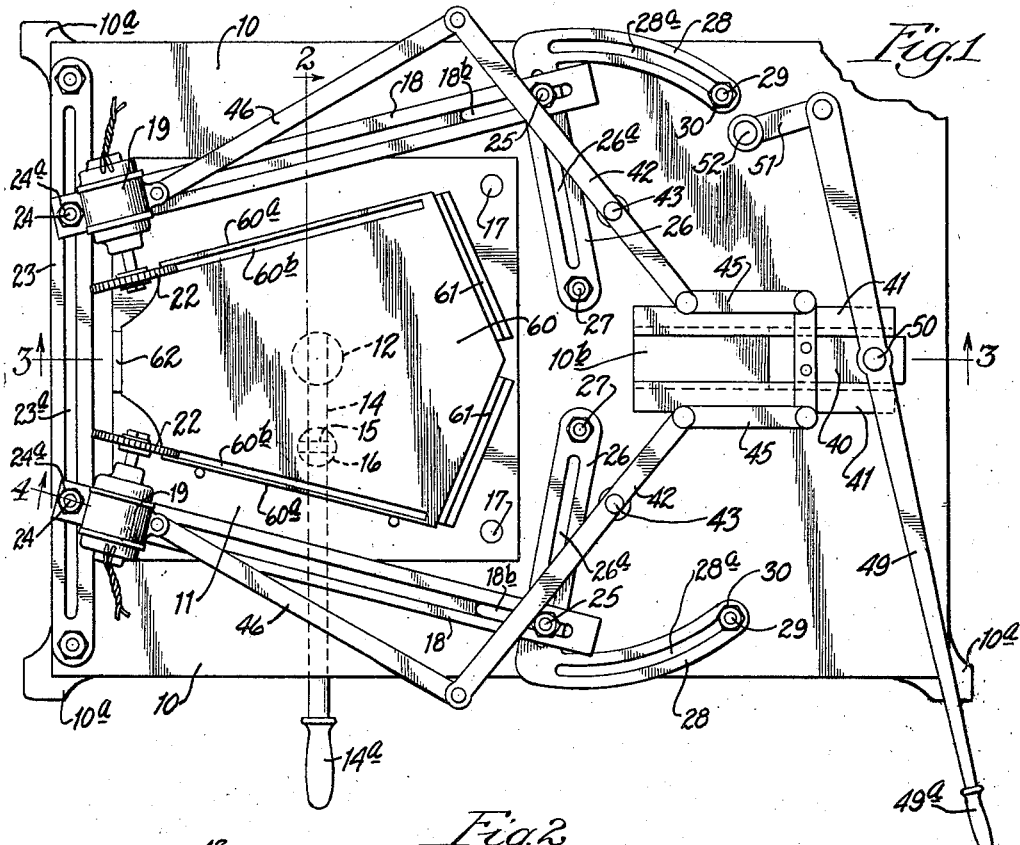
Figure 2:
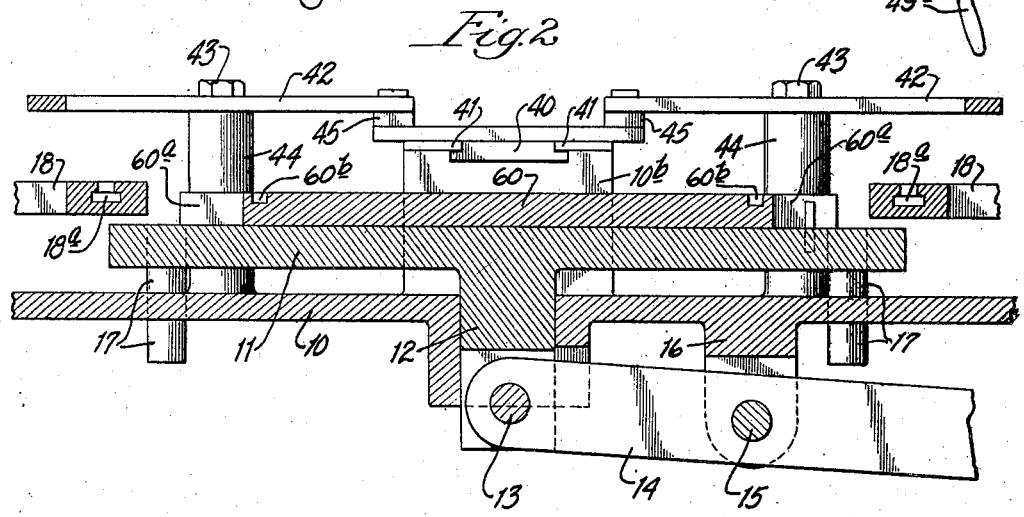

Figure 1 is a plan view; Fig. 2 is a view taken as indicated by the line 2 of Fig. 1; Fig. 3 is a view taken as indicated by the line 3 of Fig. 1; and Fig. 4 is a view taken as indicated by the line 4 of Fig. 1.

As shown in the drawings, the machine includes a suitable frame, support or base 10, here shown in the form of a rectangular table supported by the legs 10a. Numeral 11 indicates a square work support mounted on the table and adapted to be raised and lowered. This is accomplished by providing the work support 11 with the depending post 12 extending through the table and pivotally connected at its lower end at 13 to one end of the lever 14 which, in turn, is pivoted at 15 to the lug 16 under the table 10. The outer end of the lever 14 is provided with a handle 14a which may be lowered to raise the work support and vice versa. The work support is also preferably provided at its corners with four depending guide bars 17 extending through suitable holes in the base 10 to assist in holding the work support in correct position as it is raised and lowered.

Numerals 18, 18 indicate guides mounted on the base, one at each side of the work support and adjacent thereto. These guides are provided with undercut or keyhole slots 18a and each has slidably mounted thereon a rotary cutter of any suitable form. For example, the rotary cutter may include an electric motor 19 carried by the block 20 which is slidably mounted in the slot 18a of the guide 18. The motor shaft is indicated by 21 and mounted on the end thereof may be any desired cutting tool 22. For example, I have here shown the tool 22 in the form of a disk with teeth thereon for grooving or routing. It is obvious that other kinds of cutting disks may be mounted on the shaft 21 for rabbeting, cutting or otherwise operating on the work.

The guides 18 are mounted on the base 10 to permit their adjustment to different positions with respect to the work support. This is accomplished by providing across one end of the base 10 a transverse guide 23 also provided with a keyhole slot 23a. One end of each of the guides 18 is adjustably mounted in the cross guide 23 by means of the bolt 24. The other end of each of the guides 18 is provided with a longitudinal slot or opening 18b through which extends an adjusting bolt 25 with the nut thereof in a keyhole slot 26a in the member 26, which is pivotally attached at one end to the base 10 at 27. The outer end of the member 26 is provided with an arc-shaped link 28 provided with a slot 28a embracing a bolt 29 mounted in the base 10 and provided with a nut 30.

It will be seen that by this construction, the guides 18 may be angularly adjusted with respect to each other or with respect to the work support 11. One end of each of these guides 18 may be transversely adjusted across the end of the base 10 by moving the bolt 24 in the guide 23; and the other end may be adjusted by moving the bolt 25 in the member 26, and the latter may be rocked on its pivot 27 as desired, and held in position by the nut 30 on the bolt 29.

The rotary cutters are adapted to engage work on the work support when the latter is in its raised position and means are provided for sliding the cutters on their guides. This means includes a block 40 slidably mounted on a raised portion 10ᵇ of the base between the guides 41, 41. Numerals 42, 42 indicate a pair of levers pivotally mounted at 43 to the base 10 on the post 44. One end of each of said levers is connected to the block 40 by means of the links 45, as shown, and the other ends of said levers 42 are connected to the rotary cutters by means of the links 46. The block 40 is adapted to be reciprocated by means of an operating lever 49 pivoted thereto at 50 and having one end fastened to the short link 51 which, in turn, is pivoted at 52 to the base 10. The other end of the lever 49 projects out to one side of the base and is provided with an operating handle 49ᵃ. It will be seen that movement of the handle 49ᵃ will reciprocate the block 40 and, operating through the links and levers, slide the cutters on the guides 18.

As stated, a great variety of kinds of work can be performed with the present machine. Merely by way of example, I have shown the same equipped for routing the edges of a panel which is not rectangular. For example, 60 may indicate a thin flat panel mounted on the work support 11 and held in position by suitable stop members 61 and 62. The edges of this panel, as indicated by 60ᵃ, are not parallel but lie in angular relation to each other. As here shown, the machine is set to cut grooves 60ᵇ in this panel near the edges thereof and parallel thereto. This is accomplished by setting the guides 18 into parallel relationship with the edges 60ᵃ and spacing the same so that the cutting tool 22 will cut the grooves 60ᵇ where desired. The guides 18 are then permanently set in position by tightening the nuts 24ᵃ on the bolts 24 and by tightening the bolts 25, 27 and 29. When so set, the work, here indicated as the panel 60, is placed in position on the work support 11. The same is then raised by depressing the handle 14ᵃ and the handle 49ᵃ is then reciprocated to slide the cutters 19 on the guides 18 to cause the cutting tools 22 to cut the grooves 60ᵇ, as shown.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possibly, in view of the prior art.

What I regard as new, and desire to secure by Letters Patent, is:

A machine of the character described including; a suitable base; a work support mounted thereon; means for raising or lowering the work support; a guide on the base at each side of the work support and adjacent thereto; a rotary cutter slidably mounted on each guide and adapted to engage work on the work support when in its raised position; means for adjusting the positions of the guides with respect to the work support; and means for sliding the cutters on the guides, said means including a block slidably mounted on the base, means for sliding the block, a pair of levers pivotally mounted on the base, links connecting the block with one end of each of said levers, and links connecting each cutter with the other end of each of said levers.

In witness whereof I have hereunto set my hand this 13th day of May, 1929.

WILLIAM GILLOOLY.